United States Patent

[11] 3,594,824

[72] Inventor Ahmad Aref Nakib
 Beirut, Lebanon
[21] Appl. No. 843,876
[22] Filed Apr. 14, 1969
[45] Patented July 27, 1971
[73] Assignee Regents of the University of Minnesota
 Minneapolis, Minn.
 Continuation-in-part of application Ser. No. 512,923, Dec. 10, 1965, now Patent No. 3,438,894.

[54] TOROIDAL HEART VALVE
 12 Claims, 6 Drawing Figs.
[52] U.S. Cl. .................................................. 3/1,
 137/533.19, 137/516.19, 137/513.5
[51] Int. Cl. ....................................................... A61f 1/22,
 F16k 15/08, F16k 15/14
[50] Field of Search.......................................... 3/1, DIG. 3;
 137/533, 528, 533.11, 533.13, 533.17, 533.19,
 535, 543.19, 512.1, 516.15, 516.17, 516.19,
 516.21, 516.23, 513.5, 515.5, 516.29

[56] References Cited
 UNITED STATES PATENTS
1,354,318 1920 Longacre ..................... 137/516.21
2,275,627 3/1942 Hartmann ..................... 137/516.19 X
2,329,576 9/1943 Anderson ..................... 137/516.29
3,063,467 11/1962 Roberts, Jr. et al. .......... 137/516.29
3,099,016 7/1963 Edwards........................ 3/1
 FOREIGN PATENTS
 1,172 1887 Great Britain................ 137/533

Primary Examiner—Richard A. Gaudet
Assistant Examiner—Ronald L. Frinks
Attorney—Burd, Barddock & Bartz ABSTRACT: A toroidal heart valve having an annular base with an outer groove for carrying a suture ring and a central circular opening. A toroidal valve element having a central hole selectively moves relative to the base to open and closed positions. Located in the central area of the circular opening of the base is a center member having an outer continuous wall cooperating with the inner peripheral surface of the valve element when the valve element is in the closed position to restrict the flow of fluid in one direction through the opening in the base. An open cage secured to the base having a plurality of legs and inwardly turned fingers limits and directs the free floating movement of the valve element toward and away from the base.

PATENTED JUL 27 1971

3,594,824

INVENTOR.
AHMAD AREF NAKIB
BY
Burd, Braddock & Bartz
ATTORNEYS

PATENTED JUL27 1971

INVENTOR.
AHMAD AREF NAKIB
BY
Burd, Braddock & Barty
ATTORNEYS 3,594,824

1

TOROIDAL HEART VALVE

CROSS-REFERENCE TO RELATED APPLICATION

This application is a continuation-in-part of U.S. application Ser. No. 512,923 filed Dec. 10, 1965, now U.S. Pat. No. 3,438,894.

BACKGROUND OF THE INVENTION

At present, several types of heart valves are available for replacement of damaged natural aortic, mitral, or tricuspid valves. These valves are one-way check valves having valving elements which move to open and closed positions to control the direction of flow of blood through the heart. In operation, the prior art valves do not substantially simulate the valving action of the natural aortic or mitral valves. The valve unit of this invention obviates this disadvantage by closely simulating the flow characteristics of the natural heart valve.

SUMMARY OF THE INVENTION

The valve unit of this invention has a base adapted to be secured to supporting structure. The base has an opening which is opened and closed by a free floating toroidal valve element located adjacent the base by an open cage used to limit movement of the valve element away from the base. Located along the longitudinal axis of the opening is a fixed center member. The toroidal valve element has an inner peripheral surface defining an opening and an outer peripheral surface. When the valve element is in the closed position the inner and outer peripheral surfaces cooperate with the base and center member to restrict the flow of fluid, as blood, in one direction through the opening in the base. The open cage has preferably relatively short upright arms which permit maximum range of movement of a toroidal valve element about equal to the radius of the opening in the base. The relative shortness in height of a toroidal valve element as compared to its width, permits the construction of a valve design with a short cage. This is crucial in the mitral position since it avoids trauma to the ventricular septum. In addition, a toroidal valve element has true central flow as well as circumferential peripheral flow providing for improved pressure efficiency and minimizing the pressure gradient on the moving fluid across the valve opening. The valve unit is symmetrically constructed to have characteristics of wearability and durability providing for a long operative life.

IN THE DRAWINGS

Figure 1:
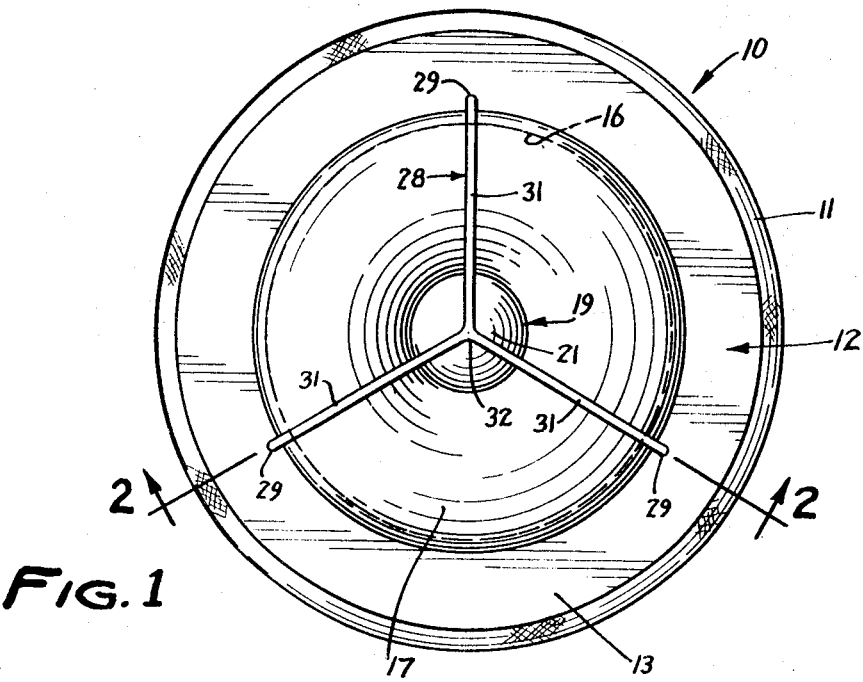
FIG. 1 is a plan view of the valve unit of this invention.
Figure 2:
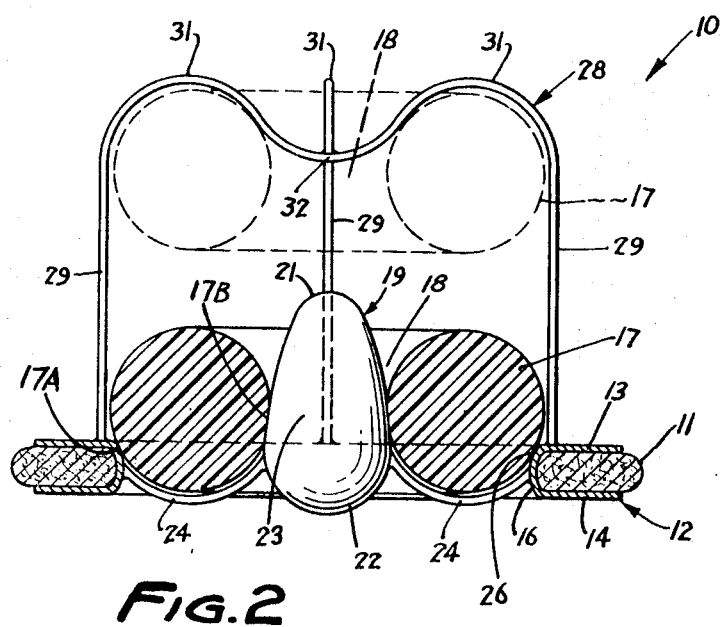
FIG. 2 is a sectional view taken along the line 2-2 of FIG. 1 showing the toroidal valve element in full lines in the closed position and in broken lines in the open position.

Referring to the drawings, there is shown in FIGS. 1 and 2 the valve unit of this invention indicated generally at 10 in assembled relation with an annular support ring 11 used to secure the valve unit in a fluid passage. The valve units shown in the drawings are one-way check valves and are particularly described hereinafter as heart valves. The following description is a specific example of one application of valve unit 10 which is not intended to limit the use or application of the valve unit. The valve unit 10 can be used in other environments which require structure for controlling the direction of flow of a fluid. As a heart valve support ring 11 is a suture fixation device which may be a "Dacron" cloth collar, a woven "Teflon" ring, or any other fixation means, such as a self-suturing device.

Valve unit 10 comprises a flat base indicated generally at 12 positioned about the support ring 11. Base 12 is a one-piece annular or ring-shaped member having a central passage or opening and a general channel shape in radial cross section. Base 12 comprises a flat top ring 13 and a flat bottom ring 14 integral with an upright convex curved wall 16. The exterior surface of convex curved wall 16 defines the central opening. Base 12 is a rigid one-piece member such as stainless steel, titanium, plastic or the like.

The central opening is selectively opened and closed with a toroidal valve element or annulus 17 which functions as a valving element movable to open and closed positions as shown in broken and full lines in FIG. 2 in response to pressure differences on opposite sides of the base 12. Annulus 17 has a smooth curved outer surface, a continuous outer peripheral surface 17A, an inner peripheral surface 17B and a central passage 18. The annulus 17 is a one-piece member formed from plastic material which is light in weight, and resistant to wear, such as "Silastic." Annulus 17 may be made of any material, metallic, as titanium, or otherwise, solid or hollow.

When annulus 17 is in the closed position as shown in full lines in FIG. 2, a center member 19 having generally teardrop or cone shape, projects through central passage 18 adjacent the inner peripheral surface 17B of the annulus 17. Center member 19 has a generally oblong egg shape and is made from rigid wear resistant material such as stainless steel. The top end 21 has a semispherical shape. The bottom end 22 has a larger semispherical shape. Top end 21 and bottom end 22 join with a side surface 23 which is smooth, slightly curved and tapers upwardly toward top end 21. The center member 19 has an upright longitudinal axis coincident with the axis of the valve unit as well as the longitudinal axis of the central opening in the base 12.

Center member 19 is held in the central longitudinal position with downwardly curved radial legs 24 secured at their inner ends to circumferentially spaced portions of the center member 19 which lie in a plane passing through the largest diameter of the center member. Opposite ends of the legs 24 are secured to the midportions of the curved wall 16 of the base 12.

As shown in FIG. 2, the large semispherical bottom end 22 of the conoid projects slightly below the bottom plane of the base 12 and the slightly curved and upright tapered side surface 23 as well as the semispherical top end 21 project upwardly from the base 12. When annulus 17 is in the closed position the bottom surface of the annulus is located in the central opening spaced from the legs 24 whereby a circumferential outer peripheral surface 26 of the annulus sealingly engages the upper circumferential portion of the curved wall 16 of he base 12. This portion of wall 16 serves as a seat circumventing the opening in base 12. At the same time the inner circumferential peripheral surface 17B of the annulus 17 is located adjacent and may be in sealing engagement with a circumferential section of the tapered side surface 23 of the center member 19. In the closed position annulus 17 can engage the base 12 as well as the center member 19 and thus restrict flow of liquid downwardly through the opening in the base 12.

The entire annulus 17 is enclosed within an open cage indicated generally at 28 which limits the movement of the annulus between open and closed positions with respect to the opening in base 12. The height of the cage is about three-fourths of the diameter of the opening in the base and limits the range of motion of annulus 17 by a distance equivalent to the radius of the opening in the base 12.

Cage 28 comprises three equally circumferentially spaced upright legs 29 having inwardly curved radial ends 31 which are joined together at an apex or center point 32. The legs 29 are smooth and stiff rod members. Ends 31 each have a curvature which is slightly greater than the circular cross-sectional curvature of the annulus 17. The terminal portions of the ends 31 have reverse curves positioning the apex point 32 substantially in the central transverse plane of the annulus 17 when in the open position along the longitudinal axis of the valve unit. The lower ends of legs 29 are secured to and may be integral with the top ring 13 of base 12. The upright legs 29 project upwardly from ring 13 and are located closely adjacent the outer peripheral sides of annulus 17 to guide the annulus in a linear path to open and closed positions. The annulus may have different cross-sectional shapes as a generally rectangular-shaped cross section to reduce the height of the annulus to a minimum. The annulus may have a tubular cross-sectional shape to provide a valving element with a minimum of weight. The annulus may have an elliptical shape. The shape of the valving member is determined by the shape of the passage in the base as well as the shape of the center member 19.

In operation, assuming that the annulus 17 is in the closed position as shown in full lines in FIG. 2, an increase in fluid pressure on the bottom side of the valve unit forces annulus 17 in an upward direction to the open position as shown in broken lines. Upward movement of the annulus 17 is limited by the curved ends 31 of the cage 28. In the open position fluid flows upwardly through central opening in the base 12 through central opening 18 of the annulus 17 as well as circumferentially around the outside of annulus 17. This minimizes turbulence in the fluid flow and reduces the pressure gradient across the valve opening. The annulus 17 is not subjected to localized wear and fatigue because it is confined in a free floating manner within the cage 28. It freely moves between the open and closed position and can rotate around the longitudinal axis of the valve unit. The annulus 17 moves between the open and closed positions in response to a negligible amount of work to overcome the static inertia of the annulus.

The annulus moves from the open position to the closed position on a decrease of fluid pressure below the base 12. When fluid begins to flow in a reverse direction downwardly through the central passage of base 12 the annulus 17 quickly moves into sealing engagement with the convex curved wall 16 and adjacent the side surface 23 of the center member 19.

Figure 3:
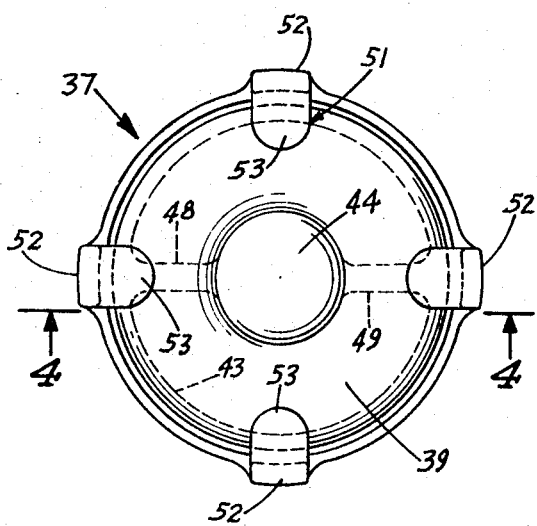
FIG. 3 is a plan view of a modification of the valve unit of the invention.
Figure 4:
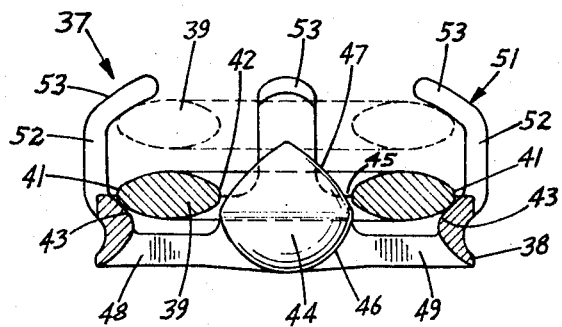
FIG. 4 is a sectional view taken along the line 4-4 of FIG. 3 showing the valve element in full lines in the closed position and in broken lines in the open position.

Referring to FIGS. 3 and 4, there is shown a modified valve unit indicated generally at 37 for controlling the direction of flow of a fluid. Valve unit 37 has a circular base 38 formed with an outwardly opened groove for accommodating a suture fixation ring. Base 38 has a circular opening providing a passage through the base which is opened and closed by a toroidal valve element 39. Valve element 39 has a generally elliptical shape in cross section with a continuous outer peripheral surface 41 and a continuous inner peripheral surface 42. When the toroidal element 39 is in the closed position a circumferential portion of the outer peripheral surface 41 of the element engages a circumferential seat 43 on the base surrounding the opening. Seat 43 is inclined upwardly and outwardly, preferably at an angle of about 45° to the horizontal plane of the base. The taper or angle of the wall of the valve element 39 adjacent the seat relative to the horizontal plane is less than the inclination of the seat. The fluid located between the angularly related seat and wall acts as a cushion during the closing of the valve element thereby reducing noise.

Located along the longitudinal axis of the base is a center member 44 which cooperates with valve element 39 to close the opening in the base restricting flow of fluid in one direction through the opening. Center member 44 has a general teardrop shape and is positioned centrally of the opening in the base 38. The lower end of the center member 44 has a generally semispherical-shaped lower portion 46 and generally cone-shaped upper portion 47. The upper portion is smaller than the bottom portion. The major diameter of the center member 44 is located in a horizontal plane that passes through a portion of the seat 43. The shape of the lower portion 46 and upper portion 47 may be the same, i.e. both portions may have a general pointed cone shape directed in opposite directions. Circumferentially spaced radial legs 48 and 49 rigidly support the center member 44 on the base 38. Legs 48 and 49 are secured at their inner ends to circumferentially spaced portions of the center member 44 and are secured at their outer ends to the base. Legs 48 and 49 are located generally within the base opening. A number of legs or a single leg can be used to secure the center member 44 to the base 38.

When the toroidal valve element 39 is in the closed position as shown in full lines in FIG. 4 the inner peripheral surface 42 of the valve element 39 is spaced from the adjacent outer surface of the center member 44. At the same time outer peripheral surface 41 of the valve element 39 is in engagement with seat 43 thereby restricting the flow of fluid through the opening in base 38. This annular space 45 between the closed valve element 39 and center member 44 permits a small reverse flow or retroflow of fluid through the opening. This reverse flow of fluid provides a wash action and continuous movement of fluid in the area of the center member 44.

An increase of pressure of the fluid below base 38 raises the toroidal valve element 39 to the open position as shown in broken lines in FIG. 4. An open cage means 51 extended upwardly and about a portion of valve element 39 directs the movement and determines the open position of valve element 39. Cage means 51 comprises spaced upright arms 52 secured at their lower end to the top of base 38. The top section or fingers 53 of arms 52 are curved inwardly. The arms 52 are spaced from the outer peripheral surface 41 of the valve element so that the valve element is free to rotate and float between its open and closed positions. When the valve element 39 is in the open position fluid flows through the opening in base 38 around the outer peripheral surface of the valve element as well as through the central opening in the valve element. Open cage means 51 limits movement of the valve element 39 away from the base 38 as well as provides a stop for the valve element. Base 38, center member 44, legs 48 and 49 and open cage 51 may be formed from a single piece of material, as titanium.

Figure 5:
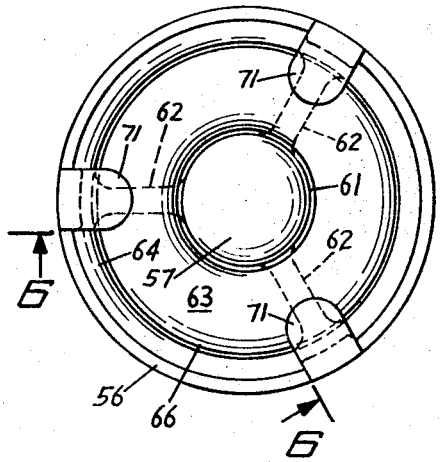
FIG. 5 is a plan view of another modification of the valve unit of the invention.
Figure 6:
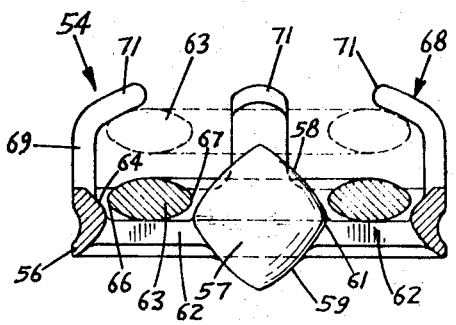
FIG. 6 is a sectional view taken along the line 6-6 of FIG. 5 showing the valve element in full lines in the closed position and in broken lines in the open position.

Referring to FIGS. 5 and 6 there is shown a further modification of the valve unit indicated generally at 54. Valve unit 54 has a circular base 56 formed with an outwardly opened groove for accommodating a suture fixation ring. Base 56 is a ring structure defining a circular opening forming a passage for the flow of fluid through the base.

A center member 57 is positioned along the longitudinal axis of the opening in the base 56 and the longitudinal axis of the base. Center member 57 has a generally cone-shaped upper portion 58 and a similar cone-shaped bottom portion 59. Each portion has a continuous smooth surface joined together at an outer peripheral surface 61. Center member 57 may have other shapes and contours, such as the shape of center member 44 shown in FIG. 4. A plurality of inwardly directed legs 62 are secured to circumferentially spaced portions of the center member 57 and base 56. The number and spacing of the legs 62 may vary to fix the center member 57 to the base 56.

Located between the center members 57 and the inner face 64 of the base 56 is a toroidal valve element 63 operable to permit substantially uninterrupted flow of fluid in one direction through the valve opening and restrict the flow of fluid through the valve opening in the opposite direction. Valve element 63 has a generally elliptical cross section with an outer peripheral edge surface 66 and an inner peripheral edge surface 67. When the valve element 63 is in the closed position as shown in full lines in FIG. 6 the element located in the opening in the base is in engagement with legs 62. The legs 62 act as stops for the valve element. When the valve element 63 is in its closed position the outer peripheral edge surface 66 is spaced from the inner face 64 of the base and the inner peripheral edge surface 67 is spaced from the center member and thereby restricts the flow of fluid downwardly through the opening. The annular spaces between the closed valve element 63 and center member 57 and base 56 allows a small reverse flow or retroflow of fluid through the opening. The amount of reverse flow is dependent on the size of the spaces. This reverse flow of fluid provides a wash action and continuous movement of fluid adjacent base 56 and center member 57.

Open cage means 68 coacts with valve element 63 to direct movement of and limit movement of the valve element away from the base to define the open position of the valve element as shown in broken lines in FIG. 11. The open cage means 68 comprises three circumferentially spaced upright arms 69 secured at their lower ends to the base. From the top of base 56 arms 69 project upwardly and function as guides for valve element 63. Each arm 69 has an upper end section or finger 71 inclined inwardly. Sections 71 are engaged by the valve element 63 and may be viewed as stops for limiting the upward movement of the valve element.

Valve element 63 moves from the open position to the closed position in response to a reduction of pressure below base 56. On downward movement valve element 63 is guided by the upright arms 69 to direct the valve element to its closed position against legs 62.

In summary, the valve units herein described are one-way check valves which can be constructed of any suitable material, such as metal or plastic, having the characteristics of wearability and durability. The valve units have symmetrical and concentric cooperating surfaces which include inner and outer peripheral surfaces on a free floating toroidal valve element to restrict the flow of fluid in one direction through the units. When the valve element is in the open position flow moves through the valve base opening around the element as well as through the center opening in the element. This flow of fluid is substantially uniform and nontraumatic in nature making the valve units particularly adapted to replace damaged aortic, mitral or tricuspid heart valves.

The specific embodiments described are given by way of example. Other modifications, changes in materials and variations of this invention of the valve unit may be made without departing from the spirit and the scope of the invention.

The embodiments of the invention in which I claim an exclusive property or privilege are defined as follows:

1. A heart valve for controlling the flow of blood in the heart comprising: a base having an inner peripheral surface defining an opening through the base, said surface including an upwardly and outwardly directed annular seat, a generally toroidal-shaped valve element freely movable to an open position and a closed position relative to said opening in the base to control the flow of blood in one direction through the valve, said valve element having an inner peripheral surface defining an opening through the valve element and an outer annular peripheral surface, a center member having a continuous outer wall, said wall having a longitudinal axis coincident with the axis of the opening in the base, said outer annular peripheral surface of the valve element being in engagement with said annular seat and said continuous outer wall located adjacent said inner peripheral surface of the valve element whereby the valve element is in the closed position to restrict the flow of blood in one direction through the opening in the base, said outer wall of the center member and inner peripheral surface of the valve element being spaced from each other to permit restricted reverse flow of blood when the valve element is in the closed position, said valve element inner and outer peripheral surfaces being spaced from the center member and base, respectively, when the valve element is in open position, support means secured to the center member for fixing the location of the center member relative to the base, and open cage means secured to the base for limiting free floating movement of the valve element away from the base to the open position.

2. The heart valve of claim 1 wherein said cage means includes circumferentially spaced upright legs having inwardly directed ends spaced from the base engageable with the valve element when in the open position.

3. The heart valve of claim 1 wherein the top portion of the center member has a general inverted cone shape.

4. A heart valve defined in claim 1 wherein said base is an annular member having at least one outwardly open peripheral groove.

5. The heart valve defined in claim 1 wherein said support means comprises at least one generally radial leg secured to the base and the center member.

6. The heart valve defined in claim 5 wherein said one leg extends from the base to the center member and is located generally within the opening in the base.

7. The heart valve defined in claim 1 wherein said center member has opposite ends of substantially the same shape.

8. The heart valve defined in claim 1 wherein said center member has a generally semispherical-shaped bottom end and a generally cone-shaped top end.

9. A heart valve for controlling the flow of blood in the heart comprising: a base having an inner peripheral surface defining an opening through the base, a generally toroidal-shaped valve element freely movable to an open position and a closed position relative to said opening in the base to control the flow of blood in one direction through the valve, said valve element having an inner peripheral surface defining an opening through the valve element and an outer peripheral surface, a center member having a continuous outer wall surface, said wall surface having a longitudinal axis coincident with the axis of the opening in the base, said outer peripheral surface of the valve element cooperating with the inner peripheral surface of the base and said continuous outer wall surface cooperating with said inner peripheral surface of the valve element, at least one of said cooperating surfaces being spaced from each other whereby the valve element is in the closed position to restrict the flow of blood in one direction through the opening in the base, said valve element inner and outer peripheral surfaces being axially spaced from the center member and base, respectively, when the valve element is in the open position, support means secured to the center member for fixing the location of the center member relative to the base, and open cage means secured to the base for limiting free floating movement of the valve element away from the base to the open position.

10. The heart valve of claim 9 wherein each of said cooperating surfaces on the valve element, base and center member are spaced from each other to permit restricted reverse flow of blood through the opening when the valve element is in the closed position.

11. The heart valve of claim 9 wherein the valve element engages the support means when located in the closed position.

12. The heart valve defined in claim 9 wherein said center member has opposite ends of substantially the same shape.